United States Patent [19]

Secka

[11] Patent Number: 4,760,443
[45] Date of Patent: Jul. 26, 1988

[54] DISPLAY MEANS

[75] Inventor: Jan Secka, Baden, Austria

[73] Assignee: Technolizenz Establishment, Triesen, Liechtenstein

[21] Appl. No.: 883,579

[22] Filed: Jul. 9, 1986

[30] Foreign Application Priority Data

Jul. 10, 1985 [CH] Switzerland .................. 2994/85

[51] Int. Cl.⁴ .................. H04N 7/00; H04N 5/66
[52] U.S. Cl. .................. 358/87; 358/230; 352/109; 352/61
[58] Field of Search .................. 358/83, 87, 250, 225, 358/230, 901; 352/40, 43, 61, 100, 109; 353/10

[56] References Cited

U.S. PATENT DOCUMENTS

| | | | |
|---|---|---|---|
| 3,324,760 | 6/1967 | Collender | 353/10 |
| 3,463,581 | 8/1969 | Clay | 352/100 |
| 3,542,948 | 11/1970 | Wolff | 358/87 |
| 3,806,244 | 4/1974 | Broeckl et al. | 352/109 |
| 3,976,837 | 8/1976 | Lang | 358/87 |
| 4,158,487 | 6/1979 | Collender | 352/40 |
| 4,431,280 | 2/1984 | Carvelo | 352/58 |
| 4,499,490 | 2/1985 | Morgan | 358/87 |
| 4,613,898 | 9/1986 | Bagnall-Wild et al. | 358/87 |

FOREIGN PATENT DOCUMENTS 170055 9/1975 Czechoslovakia .
2054901 2/1981 United Kingdom .

OTHER PUBLICATIONS

Stockholm, "Werbung mit Leuchtrohren in Schweden" from gazette "Lichttecknik"; 7/1954.

Primary Examiner—Howard W. Britton
Assistant Examiner—John K. Peng

[57] ABSTRACT

For the purpose of simultaneous presentation of an information on a display array (6) a display means has an image movement device (12,13), with the aid of which the image of the display array can be aimed in different directions, preferably along a circle. In addition, an optical bundling system (15) is provided which aims the image in one certain direction only, depending on the momentary position of the image movement device (12,13). Against the viewer a transparent screen (18;58) is provided.

11 Claims, 5 Drawing Sheets

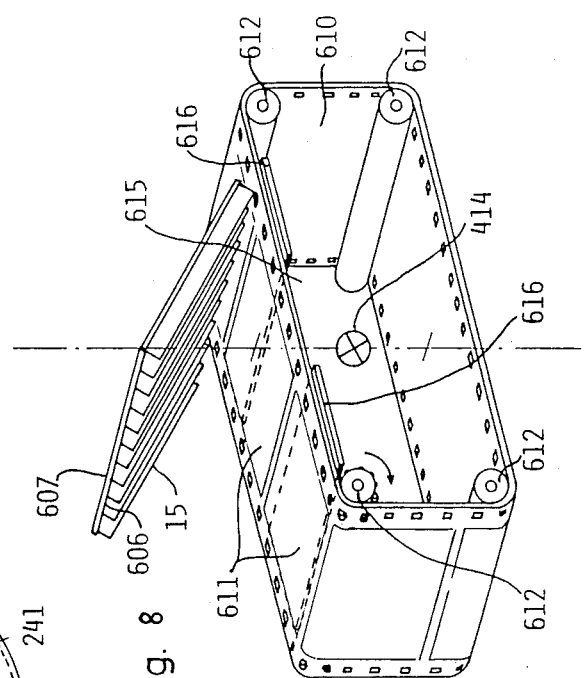
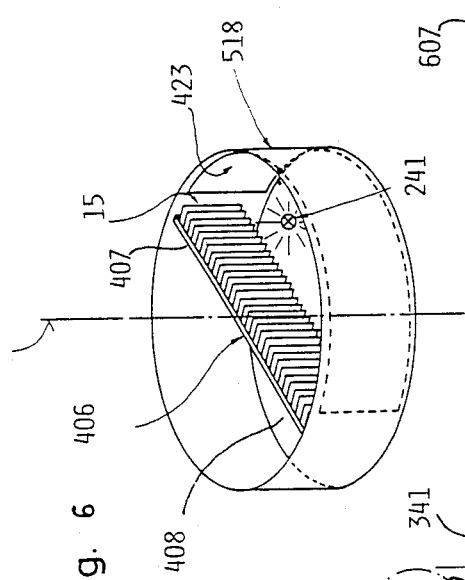
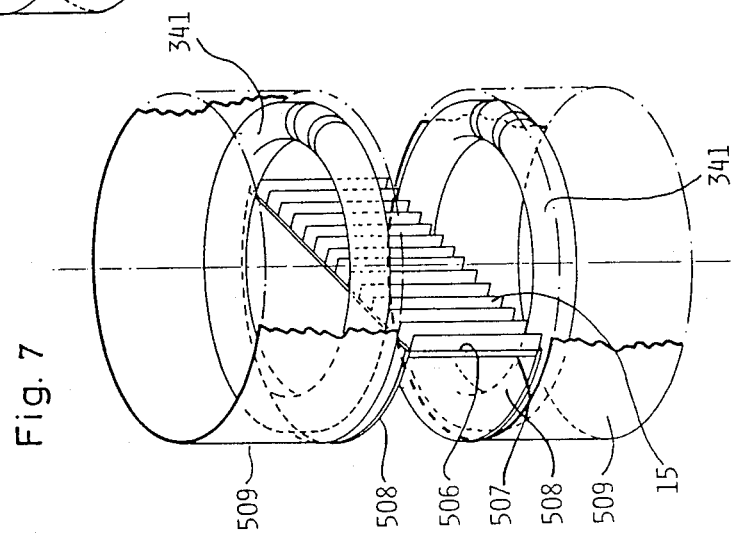

DISPLAY MEANS

FIELD OF THE INVENTION

The invention relates to display means for directing an image along an angularly movable axis.

BACKGROUND ART

Display means of this type which have been in existence to date have the deficiency that the quality of the transmission of information is very dependent on the relative position of the observer and the display means. In the case of public clocks it has been attempted to overcome this disadvantage by providing several clock faces around the tower supporting the clock. However, this involves a corresponding additional expenditure and, in any case, where four clock faces are provided on the sides of a square tower, an observer standing at an angle of 45 degrees to two clock faces can still only read the time with difficulty.

For clocks, as well as for advertising displays, it has therefore already been proposed to fasten the entire display vertically on a vertical rotary shaft, and to rotate the shaft slowly by means of a motor. Because of the slowness of the movement it can take some time until the display is aimed at an observer, so that the purpose of the means, especially in the case of an advertising surface, is often lost.

At sports events, display means are occasionally used which represent a compromise between the two aforementioned solutions: here, several display means facing in various directions are mounted, each of which also describes a pivoting movement. This solution is naturally relatively expensive.

UK Patent Specification No. 2 054 901 discloses display means comprising a cylindrical display surface for directing images of an object in all directions and optical bundling aperture means in a form of elongate lenses arranged side-by-side, so as to form a hollow cylinder. However, in this case, the display surface consists of a series of specially photographed views of an object which cooperates with the lenses to provide a three-dimensional view of the object. The display surface does not move so as to direct an image along an angularly movable axis as required by the present invention and the aperture means are designed to expose the same adjacent portions of the display surface along widely divergent axis.

U.S. Pat. No. 4,158,487 discloses similar display means comprising a cylindrical display surface, a rotatable light source directed radially through the display surface, and a concave mirror for reflecting light from adjacent portions of the display surface. Although the rotatable light source directs different parts of the image along an angularly movable axis, the image does not move and the light reflected from the concave mirror is not prevented from being transmitted at an angle to the movable axis.

U.S. Pat. No. 3,463,581 discloses display means in which a cylindrical display surface can be moved so as to direct an image displayed on the display surface along an angularly movable axis and in which aperture means are provided for simultaneously exposing adjacent portions of the display surface along lines of sight which, for each position of the movable axis, correspond with respective adjacent portions. However, these aperture means do not prevent light from being transmitted from said adjacent portions of the display surface along widely divergent axis.

U.S. Pat. No. 3,324,760 discloses display means in which a display surface, in the form of a rotatable mirror, projects an image along an angularly movable axis and aperture means rotatable with the display surface are provided for exposing adjacent portions of the display surface along lines of sight which, for each position of the movable axis, correspond with respective adjacent portions. However, the apparatus is designed to display three-dimensional images in which the lines of sight from the two eyes of an observer emanate from different portions of the display surface. To obtain this effect, it is necessary to ensure that the aperture means consist of only one viewing slot and this reduces the light reflected from the display surface.

Known forms of display means which to some extent overcome these difficulties and deficiencies comprise a display surface for displaying an illuminated image which is to be directed along an angularly movable axis; image movement means for moving the display surface so as to swing the angularly movable axis about a rotational axis; and aperture means for exposing adjacent portions of the display surface along lines of sight which, for each position of the movable axis, correspond with respective adjacent portions.

In one such known form of display means disclosed in German Published Patent Specification No. 1 123 626, the display surface extends across the diametral plane of a cylindrical drum and is rotated at high speed with the drum. The aperture means comprise an elongate slot in the drum which extends parallel to the rotational axis of the drum so that, during a portion of each revolution of the drum, regardless of the directions in which an observer views the display means, the slot scans the width of the display surface at least 48 times a second. As a result of the persistence of vision, the display surface appears to be stationary.

UK Patent Specification No. 299 788 discloses a similar apparatus in which the display surface is not mounted on a diametral plane within the drum and, instead, is mounted so as to provide an arcuate surface surrounding the slot in the drum. This provides a less distorted view of the display surface. However, in both cases, effectiveness of this apparatus is limited because the display surface is viewed through a single slot and this limits the amount of light transmitted from the apparatus and thus the visability of the display surface.

DISCLOSURE OF THE INVENTION

It is an object of the present invention to provide display means in which the herein before mentioned disadvantages are at least partly avoided and in which the image is always directed at a fixed angle to the display surface.

Moreover, the brightness of the image shall be increased without the necessity of moving bigger masses of illuminating light sources.

Moreover, the rotating display should be protected against air-squirrels, which can produce an unwanted sound, and the risk of personal accidents by touching the rotating display should be prevented.

The invention starts with a display surface arranged in a plane for displaying an image light source means for emitting light along an optical path comprising the optical axis for illuminating the display surface; image movement means for moving the display surface so as to swing the angularly movable axis about a rotational axis and aperture means for exposing adjacent portions of the display surface along lines of sight which, for each position of the movable axis, correspond with respective adjacent portions.

The object of the invention is achieved by the aperture means comprising optical bundling means which simultaneously transmit light from a plurality of adjacent portions of the displayed image along the movable axis and, at the same time, prevent light from being transmitted from adjacent portions of the displayed image at an angle to the movable axis while light reflecting means are provided for deviating the optical path of light emitted by the light source means. The display device further comprises a screen being transparent for transmitting the image which surrounds the moving image.

As a result, light is simultaneously transmitted from substantially the entire display surface and so the display surface is much clearer to an observer than the display surfaces of known display means. Moreover, light from the display surface is transmitted along an angularly movable axis which is always at a fixed angle to the display surface which is preferably 90 degrees so that the movable axis extends radially from the rotational axis about which the movable axis is angularly movable. It is to be understood that also light is transmitted from different portions of the display surface along or parallel to the movable axis, the natural spread or dispersion of light enables the different portions of the display surface to be viewed by an observer positioned instantaneously on the movable axis along lines of sight which diverge slightly from the movable axis. Similarly, as result of this spread or dispersion of light, the image displayed on the display surface will appear to move slightly in the direction of angular movement of the movable axis. However, depending on the dimensions of the optical bundling means forming the aperture means, this movement may be almost, if not wholly, imperceptible.

The display system may be enclosed by a transparent screen which possibly can also support the optical bundling means, as is known of transmitted light screen in the most diversed embodiments.

In a preferred embodiment of the invention the image movement means exhibit such a speed that the image can be aimed repeatedly in at least one direction, preferably in all directions along a circle, at least 48 times a second. However, this is by no means essential to the invention. The optical bundling means always direct the image of the display surface along the angularly movable axis and so, if the frequency of the images projected in a certain direction is 48 images per second, this gives the impression of a continuous and stable image, since as is known this frequency represent the flicker fusion threshold for the human eye. However, for advertising purposes, a certain flicker effect can be quite desirable for attracting attention. In addition, even with low frequencies, stabilization of the image can be achieved by constructing the screen as a storage screen, such as a fluorescent screen, as is often used for oscilloscopes. It is noted, however, that the image frequency of 48 images per second is not an essential feature and that the display means need not be provided with a storage screen for stabilizing the image.

It is the very configuration of the system as a transmitted light system which makes it desirable for the display surface to be provided with at least one light source for illumination of the image.

Embodiments of the invention, which contain further optional features, are hereinafter described by way of example with reference to the accompanying drawings.

BRIEF DESCRIPTION OF THE DRAWINGS

FIGS. 6 and 7 are perspective views of two further embodiments which are similar to each other; and FIG. 8 is a perspective view of an embodiment of the invention for displaying a limited number of different images.

BEST MODES FOR CARRYING OUT THE INVENTION

Figure 1:
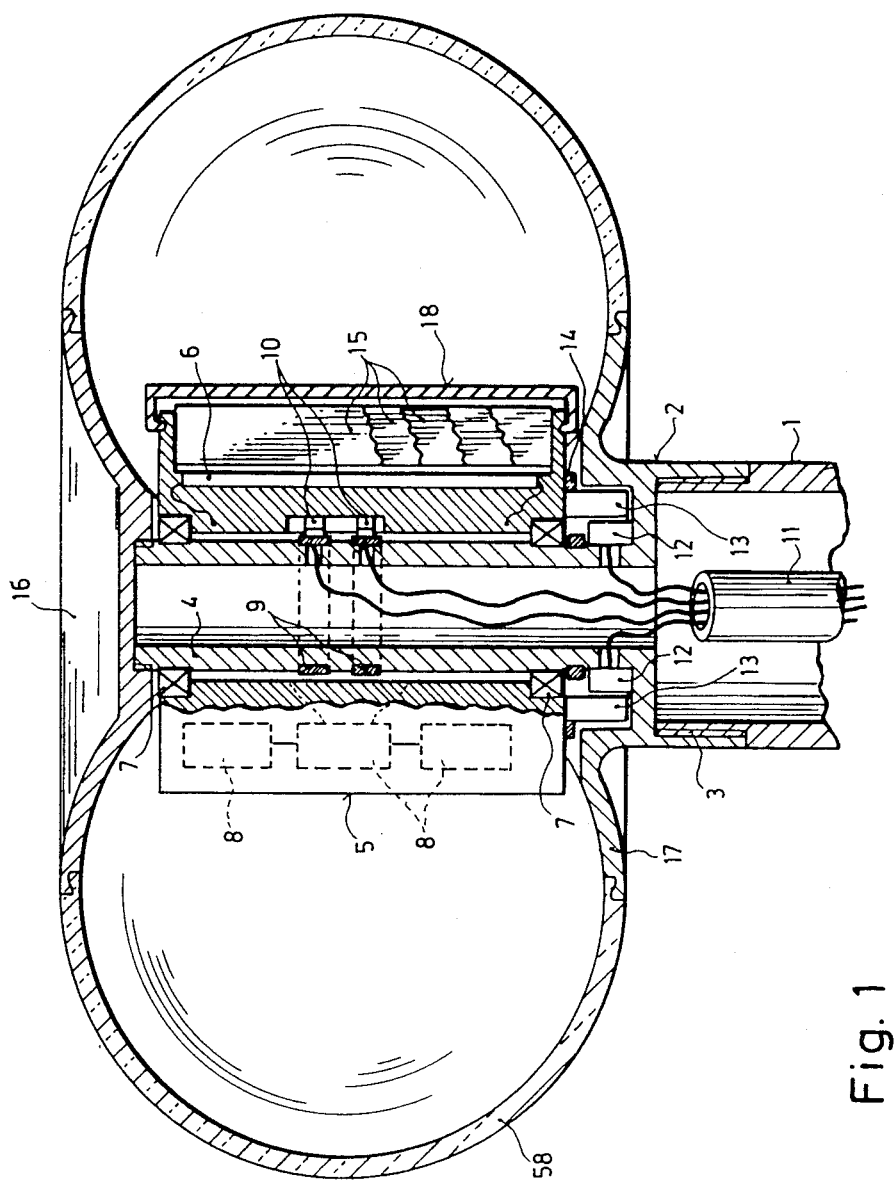
FIG. 1 is a cross-section view of a first embodiment.

In the embodiment illustrated in FIG. 1, an axle mounting 2 is screwed onto a mast 1 with a thread 3. The axle mounting 2 has a hollow central portion for and a housing 5 for accepting electronic circuits 8 (shown in dashed outline), together with a display surface 6 are mounted rotatably on the central body 4 by means of rolling bearings 7. The display surface 6 can be an LCD array, but it is preferably of the self-illuminating type, such as an LED array with luminous tubes, filament lamps or the like. It is naturally just as possible to provide the ends of light conductors, e.g. in a matrix, to use light-conducting plates, or also electrochromatic means. The energizing means required for self-illuminating display arrays are accommodated in housing 5, which can possible also accommodate a battery. However, apart from relatively small mercury batteries, such power sources have a relatively high weight which, during rotation around the central portion 4, results in undesired centrifugal forces and possibly to out-of-balance forces, which require additional balancing measures.

It is therefore preferred for the power for the electronic circuit 8 to be supplied from outside via sliprings 9 with sliding contacts 10. Current is supplied to said sliprings 9 from a cable tree 11 passing through the mast 1, from which the stator windings 12 of external rotor electric motor 12 and 13 also receive exitation energy. The poles 13 of the rotor consists preferably of permanent magnets in order that they at least need not have a separate power supply. As shown, the rotor poles 13 are fastened directly to the housing 5, by means of a joining ring 14 or by glueing. It is noted, however, that in such a configuration the motor 12 and 13 should preferably be a slow-speed motor, which in general involves higher manufacturing costs. However, a reduction gear is thereby omitted, and the spatial requirement is also minimal.

If the display surface 6, e.g. the display array of a digital clock, where rotated around the hollow central body 4, information displayed thereupon would become unreadable because of its fast movement. However, an optical bundling system is arranged in front of the display surface 6 which permits viewing only along an axis which is substantially perpendicular to the display surface 6 (even so viewing axis at other angles would also be possible, but less expedient). In the simplest case, this optical bundling system consists of a series of louver-like lamellae in the form of a lamellae grid 15 like a louver blind directly in front of the display surface 6, some of the lamellae in FIG. 1 being partially cut away for the purpose of showing the other lamellae behind them as well. By means of this lamellae grid 15, a kind of stroboscopic effect is obtained during the rotation of the housing 5, i.e. since the image displayed by the display surface 6 is only visable to a viewer at a certain point and in rapid repetition, it appears as as series of stationary exposures. However, every viewer has this impression, regardless of his angular disposition relative to the display means.

In order to protect the rotating parts, a transparent screen, consisting for example of plexiglass, is held between a cover 16 screwed onto the hollow central portion 4 of the axle mounting 2 and a flange 17 of the axle mounting 2. In the embodiment shown in FIG. 1, this screen 58 is of semi-toroidal shape. If desired, the inside of the screen 18 can be coated with a fluorescent substance in order to obtain a certain afterglow effect, thereby countering flickering in the event that the speed of rotation of the display array should be less than 48 rotations per second. However, the rotation can easily be adjusted to any given speed if the motor used is a synchronous motor, or even a stepper motor which is preferably operated continuously. However, other motors such as asynchronous motors can also be used.

The screen 58 may serve as protection against access to the rotating parts and hence as protection against injury; a further function is to protect against dust and contamination and, in the case of display means installed outdoors, also against the effects of the weather it can also be the carrier of an image storage substance such as fluorescent material.

Figure 2A:
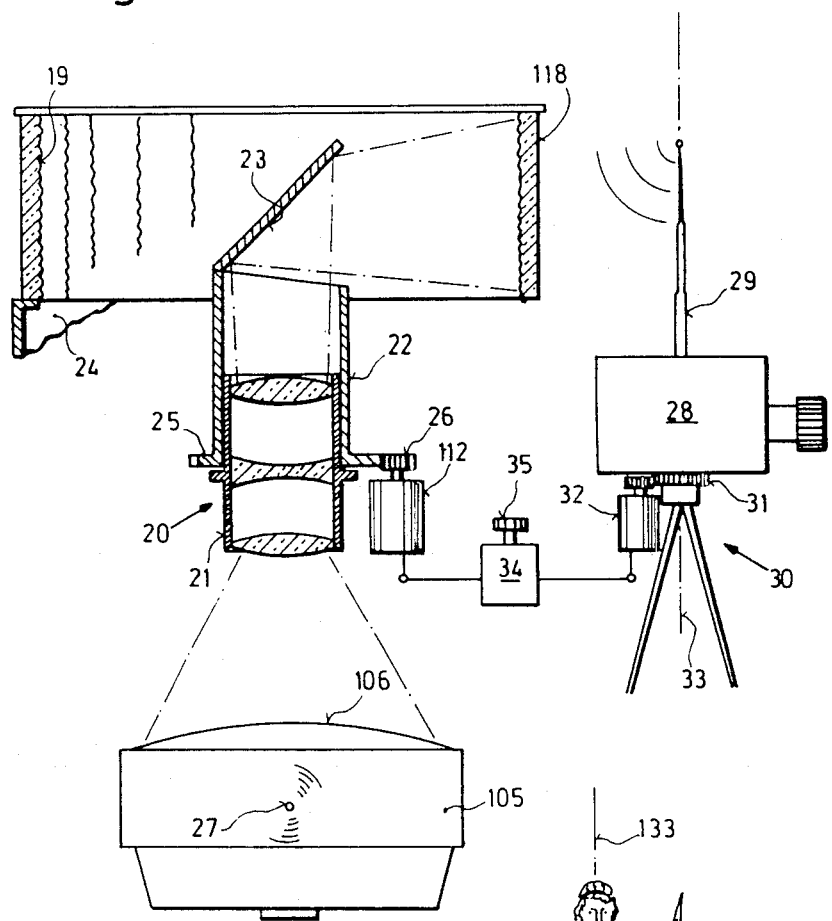
FIGS. 2A and 2B are schematic representations of two variants of a second embodiment.

To improve the directional effect even further the screen 18 or the screen 58 may be provided with an optical bundling system similar to the lenticular matrix 19 provided on screen 118, as shown in FIG. 2A. A screen such as this can be provided in view of or in addition to the lamellae grid 15. If this screen 58 is modified in this way, it not only provides protection against contamination by dust, but also contributes to the directional effect by incorporating its own optical bundling system. Optical bundling system such as this, for transmitted light projection are known and consist of Fresnel lenses, lenticular matrices (preferred) or optical fibers. In optical fiber systems, the length of the optical fibers corresponds to the thickness of the screen, the side surfaces of the fibers are joined together, e.g. by glueing, and the end surfaces of the fibers form the screen surfaces. Less effective modifications are prism or grain matrices (in the case of frosted glass screens).

In the embodiment illustrated in FIG. 2A, the display surface consists of the reflective surface 23 of a mirror which reflects the screen 106 of a television set 105. The television set 105 can, say for advertising purposes, also be connected to a still picture video recorder, in which case the screen 106 is rotated around a vertical axis synchroneously with the mirror. Rotation of the television set 105 naturally involves problems. However, it is by no means necessary for the device itself to rotate in that the picture shown on the screen 106 can be rotated electronically. As shown schematically in FIG. 2A, an objective lens system 20 is arranged in front of the screen 106. This objective lens system 20 has a relatively short focal length and so it constitutes a wide-angle system for the purpose of saving space. The objective lens system 20 has a tube Body 21 which is mounted in a manner not shown so as to be non-rotatable but axially adjustable so that the image can be focussed. Such an adjusting means is not shown, and constitutes prior art technology. The optical system may comprise a prism for maintaining the image in upright condition, though the mirror 23 is rotated. Such a prism (not shown) may be formed by a Dove-prism which has to be connected to the drive in an appropriate manner to rotate around the optical axis.

A cylinder 22 is rotatably mounted on the tube body 21 and, on its upper end, carries the mirror with the reflective surface 23. Light from the picture on the screen is transmitted through the objective lens system 20 and is projected by the mirror surface 23 through a screen 118 which is supported by a housing 24 (only part of which is shown). The mirror is driven via a gearwheel 25 fastened to the rotatable tube 22, said gearwheel in turn meshing with a gearwheel 26 of a motor 112. The gearwheels 25 and 26 constitute a reduction gearing which, if required, can also consist of more than two gearwheels. If desired the drive can also be a belt drive, e.g. with toothed belts or the like.

The screen 118 is cylindrical, and on its inside is furnished with the already mentioned lenticular matrix 19. As such, it would also be possible to apply such a matrix to the outside of the screen 118, but the danger of contamination becomes greater and cleaning more difficult.

In FIG. 2A, a special type of application is illustrated. Here, the television set 105 is equipped with an antenna 27 which receives signals from a television camera 28 via its antenna 29. The television camera 28 is mounted on a rotary tripod 30, the turntable 31 of which can be driven with the aid of a motor 32, so that the camera 28 rotates around a vertical axis 33. During the rotation of the camera 28 it scans the surrounding panorama through 360 degrees and transmits corresponding video signals via its antenna 29 to the television set 105, where it is received via the antenna 27. In this way the scenes successively scanned are reproduced on the screen 106 in the same sequence.

If the mirror surface 23 rotates at the same speed as the turntable 31 of the tripod 30, the scenes scanned in succession by the camera 28 would be projected next to one another through the screen 113. However, this does not suffice if each successive scene in the entire panarama is to be presented to several viewers at the same time. In order to make the same image simultaneously visible to viewers all around the screen 118, the mirror surface 23 must rotate at many times the speed of the rotary table 31. A synchronization adapter 34 connecting the two motors 32, 112, is provided for synchronizing rotation of the mirror with rotation of the turntable 31. The synchronization adapter can be adjusted to provide the synchronization, for effects, if this is desired.

Figure 2B:
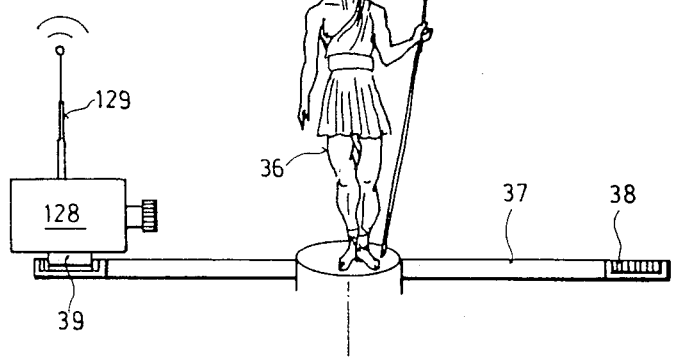

FIG. 2B illustrates a modification of the apparatus shown in FIG. 2A whereby another effect ressembling holography can be achieved. To produce a view of a statue 36 with a three-dimensional effect, a camera 128 can be moved along a path around an axis 133 through the statue 36. The path can be formed by an annular rail 37 surrounding the axis 133. The rail 37 is expediently fitted with stator poles 38 of a linear motor, while the camera 128, at all times aimed at the axis 133, can be moved along the rail 37 on a slide 39 carrying the rotor poles. In this case, the synchronization signals for the motor 112 are either transmitted by means of a special frequency band via an antenna 129 of the camera 128, or the video synchronization signals are simultaneously used to control the movement of both the motor 38 and 39 and the motor 112.

Beyond the mere novelty effect of such an arrangement, it can also be of practical significance. As is known, the presentation of jewelry for purposes of selling constitutes a considerable risk for the traveller. Conversely, if a jewelry piece to be presented is mounted on the axis 133 and photographed with the camera 128, views of this jewelry piece taken from all sides can be transmitted from a secure location.

Figure 3:
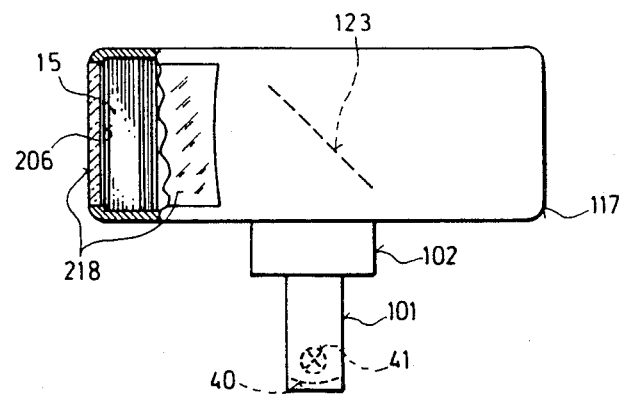
FIG. 3 is a side elevation of a third embodiment, partly in section.

FIG. 3 illustrates apparatus similar to the embodiment illustrated in FIG. 1 in that a screen 218, the function of which corresponds to the function of screen 18 in FIG. 1 is also rotatable about a central axis. In this case a rotor housing 102 is rotatably mounted on a hollow stand 101 corresponding to the mast 1 in FIG. 1, said housing 102 being solidly connected with a screen housing 117. The rotor housing 102 can be driven in an analogous manner as axle mounting 2 of the embodiment shown in FIG. 1, it being possible for a squirrel-cage motor to be provided inside the housing 102 in a similar manner to that shown in FIG. 1. Inside of the housing 117 a mirror having a reflective surface 123 is provided for reflecting light from a light source 41 onto and through a display surface 206.

The screen housing 117 accommodates a screen 218, the cross section of which is shown at the left in FIG. 3. In this case, the display surface 206 is the surface of a transparent sheet or mask which allows light to pass only at predetermined points. The light source 41 is a projection lamp fitted with a concave mirror 40 inside the hollow stand 101. In this embodiment, light passes through a bundling system formed by a lamellae grid 15 provided on the inside of the transparent sheet or mask bearing the display surface 206 (c.f. FIG. 1) along an angularly movable axis which is perpendicular to the display surface 206, so that the image on the display surface 206 can only be seen brightly when it is approximately perpendicular to a viewing axis of a viewer and this viewing axis is aligned with the angularly movable axis. However, if the housing 117 is rotated fast enough, the image is visable all around the housing 117 at all times.

With this embodiment the lamellae grid 15 could, if desired, also be provided on the outside of the screen 218, however, for safety reasons and due to the risk of dust contamination this is inappropriate.

Figure 4:
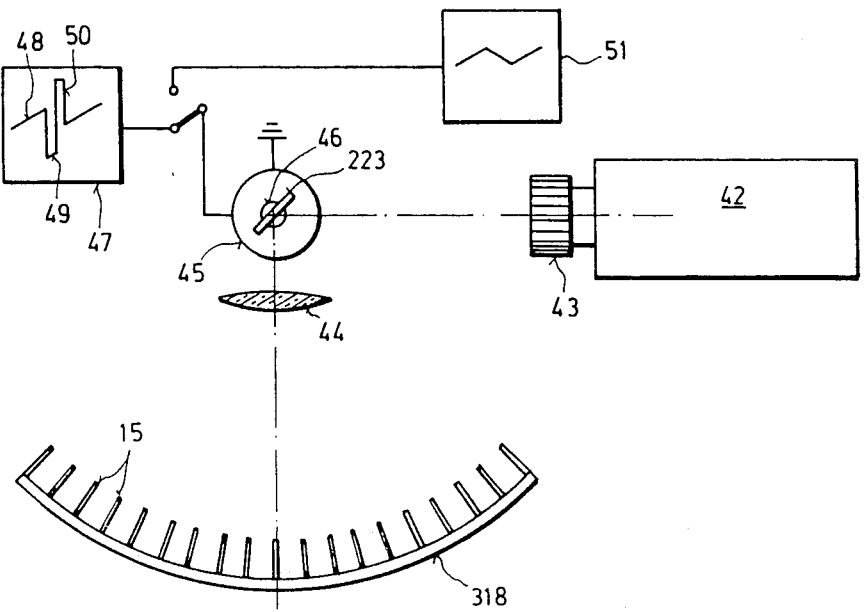
FIG. 4 is a schematic representation of a forth embodiment.

As shown in FIG. 4, the invention is not limited to apparatus providing a display which extends through 360 degrees. Thus, as shown, an arc-shaped screen 318 can also be provided. This screen 318 is fitted on its rear side with a lamellae grid 15. A slide projector 42 projects an image from a diapositive inside said projector via a lens system 43 to a display surface provided by the reflective surface 223 of a mirror of a galvanometer 45. The slide projector is inserted into a housing (not shown) supporting the screen 318. The lens system 43 is not one of the usual projection system, but only a part of a telecentric system, the other part 44 of which is schematically illustrated merely as a lens.

In this embodiment, the moving coil and associated parts of the galvanometer 45 serve as the image movement means which carry the relatively small and hence low-mass mirror 223 on its axis of rotation 46 in a similar way, as is known for other purposes from U.S. Pat. No. 3,806,244. The axis 46 is expediently located in the center of the screen 318. Consequently, the image is projected out of the projector 42 onto the mirror surface 223, and from there through the second part 44 of the projection system to the screen 318. In a modified embodiment, the telecentric optical system 43 and 44 is replaced by a standard projection lens system. As is normal with such a lens system, its beam widens and for this reason the mirror surface 223 must be relatively large. As compared to conventional image movement systems with galvanometers this is of less significance for the purpose at hand. However, the size of the mirror can be reduced by the use of a telemetric system, the mirror surface 223 of which is at the optical center and the size of which only affects the opening of the system, and hence the brightness. Here, the mirror surface 223 plays the part of a central aperture.

The galvanometer 45 can be controlled by a known trigger circuit 47, which using a voltage ramp 48 controls the slow forward motion of the mirror, the image being projected relatively slowly to all parts of the screen 318. At the end of its angular movement the mirror then receives a fast swing-back pulse 49, followed by a braking pulse 50 to break the swing-back movement. This composite pulse is supplied in known manner by the circuit 47, and for presentation of the image to be displayed can be projected along the entire length of the screen 318. The image frequencies thereby achievable are relatively high, because galvanometers have little mass and movement of the mirror surface 223 can be rapidly reversed.

However, the fast swing-back movement is not absolutely necessary, instead it is quite possible for the mirror surface 223 to project the image onto the screen 318 while pendulating to and fro at a relatively low speed. In this case the rotation speed should be high enough to ensure that from every observer position the image is seen at least 48 times per second. If, in this case, the rapid swing-back movement is not required, the mirror can have a larger mass and be large enough to direct the image through a standard projection lens system to the screen 318, in which case the second part 44 of the telecentric system can also be omitted. For this purpose the galvonometer 45 can be connected to a further circuit 51, which generates an ascending and a descending ramp signal.

In the scope of the invention numerous variants are conceivable. For example, in a modification of the embodiment shown in FIG. 1, a further display surface with the same image can also be provided on the side diametrically opposite the display surface 6, so that the speed required to avoid flickering can be halfed. If the display surface 6 is omitted screen 18 may provide the display surface in that it carries a diapositive, or merely a mask, illuminated from the rear, which only demarcates the outline of the image to be shown. Alternatively, the screen may be translucent and possibly even coloured. It is also apparent that only a little space required to set up such a display means since the mast 1 has a low space requirement, so that unused ground or floor space of very small dimensions can be used to set up such a mast; similarly, a mast 1 can easily be accommodated on shop window shelves because the required support surface area is very small. As is known in the case of displaying placards, the presentation of several displays is more effective in attracting the attention of passers-by, in which case the various displays can constitute mutually complementing information. The two display surfaces can also be provided by self-illuminating lamps or other light sources which possibly flicker for the purpose of attracting attention.

In the case of the embodiment illustrated in FIG. 2A, the viewing screen 106 does not necessarily need to be that of a television monitor. Instead it can be expedient, e.g. for purposes of demonstration, say on presentations, to use the viewing screen of an oscilloscope monitor, in which case the parts 19 to 26 can possibly interact with various exchangeable devices or display surfaces. Moreover, instead of deriving a signal from the camera 28, the monitor 105 may be connected to a video recorder. In this case, it may also be expedient to provide a synchronization adapter 34 which contains the video synchronization signal of the recorder.

Figure 5:
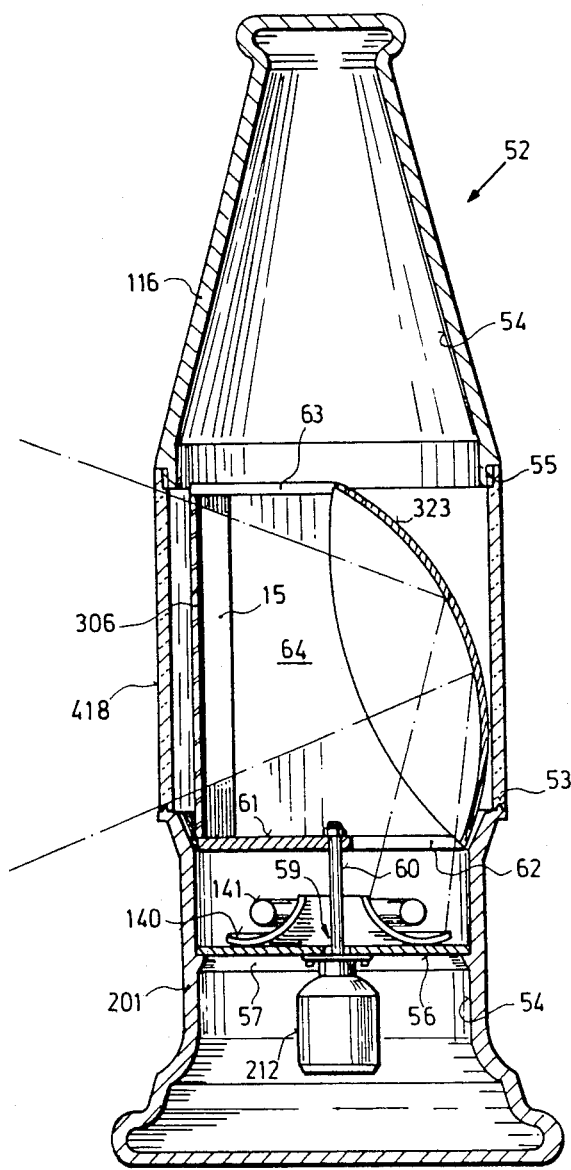
FIG. 5 is a sectional elevation of a fifth embodiment of the invention in the form of an advertising object.

Even though the standing surface (e.g. on real estate property), which is usually expensive for advertising purposes, can be extensively limited when using a mast 1, the invention is not limited to the use of such a mast. FIG. 5 shows an advertising object 52 in the form of a bottle, which is highly overdimensioned. In this case it is advantageous to construct it in several parts. A screen part 418 of transparent material is therefore mounted on a supporting part 201 by means of a tongue-and-groove connection 53. The supporting part 201 is furnished inside with a corresponding paint coating 54. Alternatively, the part 201 can consist of opaque material. A cover part 116 is fastened on the screen part 418 by means of a thread 55. The advertising object 52 can naturally have any given shape and is not limited to the form of a bottle. It can have the form of another type of container or any other object.

An annular, triangular-section bracket is formed inside the supporting part 201 and supports a plate 57. A flanged motor 212 is connected to the underside of the plate 57 and has a shaft 60 which passes through a central opening 59 in the plate 57. This motor 212 corresponds to the motor 12 and 13 and the motor 112 shown in FIGS. 1 and 2A.

A light source in the form of a fluorescent lamp 141, the mounting of which is not shown is positioned above the plate 57. A turning lock 61 is fastened to the upper end of the shaft 60, as is known on motion-picture projectors. This turning lock 61 has a transparent sector 62 which consists of an opening, but can consist of a glass plate to more evenly distribute the weight of the turning lock 61. While the fluorescent lamp 141 and the mirror 140 are stationary, lights from the fluorescent lamp 141 is supplied via the transparent sector 62 to the reflective surface 323 of a mirror located behind it on the plate of the turning lock 61. As with the mirror surface 223 shown in FIG. 4, the mirror surface 323 can be of substantially smaller size, especially if it is possible to make it part of a telecentric system, the focal point of the mirror 140 lying on the reflective surface 323 of the mirror.

The mirror surface 323 which is concave, transmits light received from the fluorescent lamp 141 through a member providing a display surface 306, said member being transparent and bearing an image, such as the trade name of a product, which is radiated all sides simultaneously due to the rapid rotation of the motor shaft 60. Here again, the lamellae grid 15 is provided for masking radiation of the image except along radial axis passing perpendicularly through the display surface 306, but the screen part 418 can additionally or alternatively be equipped with an optical system, such as a lens matrix system 19 (c.f. FIG. 2A) the display surface 306 and the lamellae grid 15 constitute parts of a support frame, which via upper crossbeam 63 supports the mirror and covering walls 64 which, on the one hand, have a supporting effect, and, on the other hand, block any stray light to the sides.

For moving-picture projectors the use of two-blade, three-blade and four-blade locks is known. If the turning lock 61 of the embodiment shown in FIG. 5 is replaced by a three-blade lock, the display means can be of hexagonal form so that opposing, parallel sides are formed on the one hand by three mirrors, and on the other hand by three display surfaces 306, the axis of the three pairs of display surfaces and mirrors thus formed standing at an angle of 120 degrees to one another. In this case the motor 212 may be a low-speed motor, i.e. it need only be one-third as fast as required for the embodiment shown in FIG. 5. However, since low-speed motors are more expensive, and the provision of all parts in triplicate incurs additional costs in any case, the arrangement shown in FIG. 5 is preferred.

However, if desired, the optical configuration of the embodiment shown in FIG. 5 can be changed, possibly by arranging the table 56 and all parts thereupon somewhat lower, to provide a display surface 306 which rotates with the lock 61 and is attached to the transparent sector of the lock 61 so that the display surface 306 is accommodated between the mirror 140 and the mirror surface 323. The display surface 306 can also be arranged somewhat outside the plane of the lock 61, and on the lock 61 in the area of the transparent sector 62 a lens system, especially a wide-angle lens system, can be mounted on the lock 61 in the area of the transparent sector 62. Further, instead of providing a display surface 306 for displaying an image, it would be conceivable to connect an advertising object as illustrated in FIG. 5 with a video system 105 (c.f. FIG. 2A) or a projector 42 to supply a changing image, such that the image shown on the screen 418 changes periodically. In this case the video system is expediently in the form of known eidophors.

In the embodiment illustrated in FIG. 6, the display surface 406 is the surface of a transparent slide 407 which is mounted vertically on a horizontal circular turntable 408 and arranged so that the display surface 406 extends dimetrically across the turntable 408 and the turntable 408 is mounted for rotation about a vertical axis aligned with the display surface 406. A black lamellae grid 15 is fitted to the other surface of the transparent slide 407 and light source 241 is mounted on the turntable 408 on the same side of the transparent slide 407 as the lamellae grid 15. A cylindrical glass screen 518 is mounted on the turntable 408 and a mirror 423 is fitted to the inside surface of the screen 518, around the light source 241. The turntable 408 is caused to rotate at 3000 r.p.m. and light from the light source 241 is directed through the lamellae grid 15 along an axis which is perpendicular to the display surface 406 and which moves angularly around the vertical axis. The image formed on the transparent light 407 is thereby directed all around the vertical axis and visible to observers in all directions.

In the embodiment illustrated in FIG. 7, the display surface 506 is the surface of a vertically arranged picture 507 which is rotatable about a vertical central axis which is aligned with the display surface 506. A black lamellae grid 15 is fitted to the display surface 506 and the display surface 506 is illuminated by means of two circular fluorescent tubes 341 mounted respectively above and below the picture 507 within cylindrical housings 509. The picture 507 is carried by two semicircular supports 508 and rotated as 3000 revolutions per minute so that light from the fluorescent tubes 341 is reflected from the display surface 506 so as to project the image shown on the display surface 506 along an axis which is perpendicular to the display surface 506 and which is angularly movable about the vertical central axis.

In the embodiment illustrated in FIG. 8, an endless band 610 of transparencies 611 is trained around four rollers 612, one of which can be driven to position the transparencies 611 successively over an aperture 615 in masking means 616 and between a light source 414 and a mirror 607 having a reflective display surface 606 inclined at 45 degrees to a transparency 611 aligned with the aperture 615. The apparatus is mounted for rotation at 3000 revolution per minute about a vertical axis through the centre of the aperture 415 and a black lamellae grid 15 is fitted to the underside of the mirror so that light from the light source 414 passes through the transparency 611 aligned with the aperture 615 to form an image which is reflected by the mirror 607 along an angularly movable horizontal axis. To change the image transmitted by the apparatus, it is merely necessary to drive the endless band 610 of transparencies 611 around the rollers 612 until a new transparency 611 is aligned with the aperture 615 in the masking means 616. In a modification of this apparatus, the image reflected by the mirror 607 is shown on a cathode ray tube or television monitor instead of on a transparency. A further modification could consist in that, instead of an endless band 610, a normal film is unwound from a supply reel to a take up reel.

I claim:

1. A display means, for directing an image along an angularly movable axis; comprising
   a display surface arranged in a plane for displaying an image;
   light source means for emitting light along an optical path comprising the optical axis for illuminating the display surface;
   image movement means for moving the display surface so as to swing the angularly movable axis about a rotational axis; and
   aperture means for exposing adjacent portions of the display surface along lines of sight which, for each position of the movable axis, correspond with respective adjacent portions;
   the aperture means comprising optical bundling means which simultaneously transmit light from a plurality of adjacent portions of the displayed image along the movable axis and, at the same time, prevent light from being transmitted from said adjacent portions of the displayed image at an angle to said movable axis, while light reflecting means are provided for deviating the optical path of light emitted by the light source means, the display device further comprising a screen being transparent for transmitting the image which surrounds the moving image.

2. A display means according to claim 1 wherein the image movement means are operable so that the image is directed repeatedly in at least one direction at least 48 times a second.

3. A display means according to claim 1 wherein the optical bundling means comprise an optical matrix on the transparent screen.

4. A display means according to claim 1 wherein a light source is provided for illumination of the display surface passing through a transparent display surface.

5. A display means according to claim 1 wherein the image movement means comprise an electric motor having at least one of the following characteristics;
   (a) it is a squirrel-cage motor,
   (b) it is a synchronous motor,
   (c) its rotor is equipped with permanent magnets,
   (d) it is a stepper motor,
   (e) it is an external rotor motor.

6. A means according to claim 1 wherein the optical bundling means comprise a a lamellae grid located adjacent the display surface whereby each lamella is in a plane which severs the plane of said light reflecting means at an angle of 90 degrees.

7. A display means according to claim 1 wherein the image is provided by a cathode ray tube monitor having a viewing screen.

8. A display means according to claim 1 wherein a variable-image transmitter in the form of a movable video camera is provided for transmitting different images to the display surface, and an image synchronizing device is provided for synchronizing movement of the image movement means with movement of the camera.

9. A display means according to claim 1 wherein the display surface is the reflective surface of a mirror, and the image movement means comprise means for moving the display surface about the rotational axis.

10. Display means according to claim 1 wherein the light reflecting means comprise at least one of the following characteristics; (a) a rotating mirror, and (b) it deflects the optical path by about 90 degrees.

11. Display means, according to claim 1, comprising two different optical bundling means.

* * * * *